United States Patent
Nielsen et al.

(10) Patent No.: US 10,533,323 B2
(45) Date of Patent: Jan. 14, 2020

(54) LAMINATED FOAM COMPOSITE BACKER BOARD FOR WET SPACE CONSTRUCTION

(71) Applicant: MGNT Products Group, LLC, Charlotte, NC (US)

(72) Inventors: Peter Nielsen, Greer, SC (US); William M. DeJesus, Charlotte, NC (US)

(73) Assignee: MGNT Products Group, LLC, Charlotte, NC (US)

( * ) Notice: Subject to any disclaimer, the term of this patent is extended or adjusted under 35 U.S.C. 154(b) by 592 days.

(21) Appl. No.: 15/188,395

(22) Filed: Jun. 21, 2016

(65) Prior Publication Data
US 2017/0362835 A1    Dec. 21, 2017

(51) Int. Cl.
*E04F 15/02* (2006.01)
*E04C 2/24* (2006.01)
(Continued)

(52) U.S. Cl.
CPC ........ *E04F 15/02188* (2013.01); *B32B 5/022* (2013.01); *B32B 5/024* (2013.01); *B32B 5/026* (2013.01); *B32B 5/18* (2013.01); *B32B 5/245* (2013.01); *B32B 5/26* (2013.01); *B32B 7/12* (2013.01); *B32B 27/06* (2013.01); *B32B 37/153* (2013.01); *E04C 2/243* (2013.01); *E04C 2/246* (2013.01); *B32B 37/12* (2013.01); *B32B 2250/05* (2013.01); *B32B 2250/40* (2013.01); *B32B 2262/0253* (2013.01); *B32B 2266/0214* (2013.01); *B32B 2266/0228* (2013.01); *B32B 2266/0264* (2013.01); *B32B 2305/022* (2013.01); *B32B 2305/18* (2013.01); *B32B 2307/51* (2013.01); *B32B 2307/54* (2013.01);
(Continued)

(58) Field of Classification Search
CPC .......... B32B 2305/022; B32B 2305/18; B32B 2419/04; B32B 2607/00; B32B 27/06; B32B 5/18; B32B 7/12; E04C 2/243; E04C 2/246; E04F 15/02188
See application file for complete search history.

(56) References Cited

U.S. PATENT DOCUMENTS

| | | |
|---|---|---|
| 5,695,870 A | 12/1997 | Kelch et al. |
| 8,703,632 B2 | 4/2014 | Schlueter |
| 2004/0043682 A1* | 3/2004 | Taylor ...................... B32B 5/18 442/42 |

OTHER PUBLICATIONS

USG News Release dated Jan. 27, 2014, "USG Introduces Lightweight Foam Backerboard for Ceramic Tile Installations", all enclosed pages cited.
(Continued)

*Primary Examiner* — Elizabeth C Imani
(74) *Attorney, Agent, or Firm* — Nelson Mullins Riley & Scarborough LLP

(57) ABSTRACT

A composite backer board for wet space construction is disclosed, along with a method of producing the backer board. The board includes a rigid foam core of a suitable thickness for wet space construction. A first fabric layer is fixed to at least one face of the rigid foam core with a polymeric adhesive. A first polymer layer is on the first fabric layer in which the polymer layer is dimensionally stable parallel to the face of the rigid foam core. A second fabric layer is on the first polymer layer opposite the first fabric layer and forms a first face that is amenable to thin set mortar and related compositions in wet space construction.

17 Claims, 5 Drawing Sheets

(51) Int. Cl.
*B23B 5/02* (2006.01)
*B32B 27/06* (2006.01)
*B32B 5/02* (2006.01)
*B32B 5/18* (2006.01)
*B32B 7/12* (2006.01)
*B32B 5/24* (2006.01)
*B32B 5/26* (2006.01)
*B32B 37/15* (2006.01)
*B32B 37/12* (2006.01)

(52) U.S. Cl.
CPC ... *B32B 2307/546* (2013.01); *B32B 2307/718* (2013.01); *B32B 2307/7246* (2013.01); *B32B 2419/00* (2013.01); *B32B 2419/04* (2013.01); *B32B 2607/00* (2013.01); *B32B 2607/02* (2013.01)

(56) References Cited

OTHER PUBLICATIONS

USG News Release dated Mar. 14, 2014, "USG Introduces Lightweight Foam Backerboard for Ceramic Tile Installations", all enclosed pages cited.

* cited by examiner

1

LAMINATED FOAM COMPOSITE BACKER BOARD FOR WET SPACE CONSTRUCTION

BACKGROUND

The invention relates to backer board used in wet space construction.

As used herein, a wet space is an interior space normally exposed to splashing, water wash-down, or other wet conditions. In many contexts, the term "wet spaces" typically refers to bathrooms, kitchens, and other interior tiled areas.

Wet space construction seeks to prevent moisture from coming in contact with wooden flooring and wall substrates so as to prevent rot and mold from forming. Rot and mold are largely responsible for substrate deterioration and a wide variety of health issues.

In modern wet space construction, tile or stone floors, walls, and countertops are typically formed by first placing a supportive backer panel over a wood subfloor or directly to wood or metal wall studs. Conventional backer panels ("backer board") include glass-fiber mesh reinforced cement backer board, fiber-cement backer board, or fiber-reinforced water-resistant gypsum backer board, etc. A waterproofing layer is then applied to the backer panel in the form of a liquid, trowel-applied or sheet membrane to which the tile or stone is then fixed to the waterproofing membrane to form a finished surface. Waterproofing beneath tile or stone is particularly important in multi-story constructions with living spaces beneath the wet space.

Tile is typically bonded to the waterproofing membrane with thin-set mortar. Thin-set mortar is a blend of cement, very finely graded sand, and a water retention compound; it can also include special latex/polymer additives. Thin-set mortar is relatively inexpensive, easy to use, and designed to adhere well in a thin layer—typically not greater than 3/16 inch thick. (The Tile Council of North America, The American National Standards Institute § A118.1 and A118.4 Specifications, last retrieved Mar. 3, 2016, available at https://www.tenatile.com/faqs/64-thinset-mortar.html).

Conventional backer boards for use in wet space construction must provide the necessary rigidity and flexural strength for tile application. Furthermore, they must have at least one surface to which mortar can be bonded for proper tile application. (Note that in this document the terms rigidity and stiffness are used interchangeably; also, the terms flexural and bending are used interchangeably.)

Conventional backer boards thus have typically consisted of glass-fiber mesh reinforced cement backer boards, fiber-cement backer boards, or fiber-reinforced water-resistant gypsum backer boards, etc., all of which are strong and rigid materials. However, conventional backer boards are permeable to moisture, thereby requiring the installation of a waterproofing membrane between the backer board and the ceramic or stone tile covering. Such boards are heavy and difficult to cut, thus requiring a high degree of trade knowledge, skill, and time to properly install.

For a number of reasons, including consumer preferences for intrinsically waterproof materials used in wet space construction, a desired increase in construction simplicity, and (in some cases) the unavailability of craftsmen who can carry out the conventional methods, the industry is moving toward simplified construction/waterproofing systems and methods that are more reliable and significantly reduce the potential for mold, rot, and mildew.

To facilitate these trends, manufacturers have developed polymer foam backer boards that are (1) intrinsically waterproof, thereby eliminating the need for additional waterproofing steps, (2) extremely lightweight and easy to cut and install, eliminating the need for highly skilled workers, and (3) since they are waterproof, can provide a cost-effective alternative to applying a waterproofing membrane over conventional backer boards. Nonetheless, manufacturing polymer foam backer boards to meet industry standards presents several challenges.

Foam panels typically by themselves lack the necessary flexural strength and stiffness to support a tile application and thus they require an additional structure or "facer" to be applied to the surface(s) of the panel. Relative to the foam panel, facers are typically much thinner and much stiffer (much higher modulus). The outer surface of the facer(s) typically has some kind of coating or additional material applied to provide a mortar-bondable surface for tile adhesion.

Several different materials or combinations of materials have been used for the facers, each with its attendant advantages and challenges. The three most prevalent are 1) paper, with a mortar-bondable fabric, 2) glass-fiber mesh with a mortar-bondable cementitious coating, or coated glass mat (which combines into one the functions of the stiffening facer and the mortar-bondable surface), and 3) polymeric film, with a mortar-bondable fabric.

Paper used as a facer can impart the necessary rigidity to a foam panel, but, in the forms that have to date been made commercially available—thin paper facers applied to both sides of the foam panel—it has the disadvantage of supplying very low flexural strength to the board when compared to conventional backer boards or foam boards that employ glass-fiber mesh and a cement coating. And, historically, paper has performed poorly in wet spaces due to its susceptibility to mold and bacteria growth. The reason for the poor flexural strength performance is rooted in the basic behavior of backer boards (indeed, all board-like structures) when they are subjected to bending loads. When the backer board is bent, one of the facers (the facer on the convex side of the bent board—call it the first facer) enters into a state of tensile stress, and the second facer (the facer on the concave side of the bent board) enters into a state of compressive stress. Note that the magnitude of the tensile stress is essentially equal to the magnitude of the compressive stress. Paper, even thin paper, is relatively strong in tension, so the first facer will support a high board bending load. The facer that is in compression, however, is subject to a structural phenomenon known as buckling. If the facers are thin, then buckling in the second facer can occur even at a low board bending load—much lower than the tensile stress capability of the first facer. Thus, it is found that a backer board with two thin paper facers has a low flexural strength.

Foam board panels that employ a glass-fiber mesh or coated glass mat have the advantage of being strong and rigid, but many require the use of plaster washers to support the panel, especially in framed-wall applications, which adds extra time and cost to their installation. In addition, the glass fibers often cause itching and skin and eye irritation during installation. Also, they have inherently higher water vapor permeability, which precludes them from being used in steam showers unless an additional low-perm waterproofing membrane/vapor retarder is applied over them prior to tile application.

Thin polymeric films, e.g., oriented polystyrene (OPS), offer many advantages for use as facers. They have relatively high tensile strength and high modulus, and thus, if applied in thicknesses of at least 0.003 inch thick, impart the necessary strength and rigidity to a foam panel such that it can support tile application. And because these films are strong and tough, the boards can be installed with ordinary fasteners using jobsite installation practices Films of this type have a low water permeability, making the boards suitable for steam room applications without additional low-perm waterproofing membranes/vapor barriers, and, because they do not contribute to the growth of mold or mildew, they are ideal for use in wet space construction. Polymeric films are, however, inherently difficult to adhesively bond to other materials.

In summary, a need exists for a lightweight, waterproof, mortar-bondable laminated foam composite backer board that employs polymeric film facers that may be reliably manufactured in a real world production environment.

Two U.S. patents—U.S. Pat. No. 5,695,870 by The Dow Chemical Company, and U.S. Pat. No. 8,703,632 by Schlueter-Systems—address foam composite backer boards for use in building construction; Schlueter-Systems for wet-space construction in particular. The inventors in the Dow Chemical patent teach that it is critical that the thermoplastic facer film be laminated to both primary surfaces of the foam panel and that any separation or slipping between the film and foam panel at their interface negates the strengthening effect of the facer film. This finding is consistent with that of other industries; for example, sandwich composite panels (as this type of structure—a low-density core "sandwiched" in between two facers—is generally known) are widely used in aerospace structures where high flexural stiffness, high flexural strength, and low weight are critical. They also teach that "The facer film may be laminated to the present foam board by any conventional method known in the art . . . " The inventor in the Schlueter-Systems patent teaches that the non-stretchable plastic webs (facers) are to be glued directly to the foam core to provide sufficient bending resistance.

Despite Dow Chemical's assertion in U.S. Pat. No. 5,695,870 that "The facer film may be laminated to the present foam board by any conventional method known in the art . . . ," and despite Schlueter-Systems' suggestion that the plastic webs (facers) are to be glued directly to the foam core, experience with conventional methods for laminating polymeric films of this type has proven to be disappointing. It has been shown that high strength laminating bonds are indeed possible, but they are inconsistent in quality from one production lot to another. The challenge is rooted in the fact polymeric films of this type are very smooth and, in this range of thickness, very stiff and rigid. They therefore do not lend themselves to conventional processing methods.

One conventional processing method is hot roll lamination. But in this thickness range, the heat required to penetrate the film to activate a heat-activated adhesive layer between the foam core and the film can destroy the foam core.

Other processing methods, e.g., roll or spray coating adhesives onto the facer film prior to laminating, present their own set of challenges because polymeric films, particularly thermoplastics, are very smooth materials lacking mechanical bonding sites.

Producing a textured polymer sheet to form mechanical bonding sites would be expensive, technically difficult, and add too much cost.

A breakthrough in the search for a reliable, consistent bond between the facers and the foam board was achieved when the inventors of the present invention inserted a polyolefin-based fabric between the foam core and a polymeric film. The fabric, which can be a scrim or knitted, woven, or nonwoven fabric, e.g., a 0.75 osy (ounce per square yard)-2.25 osy polypropylene spun bond, provides a field of mechanical bonding sites in the form of a dry, fibrous microstructure that can be enveloped by the adhesive during the facer-to-foam bonding operation.

Again, the skilled person will understand that the fabric serves a functional purpose. A fabric layer that is too thin can be subject to destruction when it comes into contact with a hot or melted polymer during manufacture of the composite. Alternatively, if the fabric is too thin, the adhesive will fill the fabric and thus defeat the purpose of adding the bonding sites. As a third disadvantage, an overly thin fabric can be difficult to handle in an otherwise cost-effective manner. In the same manner an overly thick fabric will preclude sufficient penetration of the adhesive and will leave the fabric as the weak point in the overall composite structure.

Besides providing mechanical bonding sites, the fibrous microstructure of the fabric also increases the fracture toughness of the adhesive bond. "Fracture toughness" is a material science and engineering term that quantifies the ability of a material to resist crack propagation if a crack is present. Glass used in automobile windshields is a familiar example of a material with low fracture toughness. The windshield is able to resist large loads as long as there are no cracks existing in the glass. However, once a crack is formed (often resulting from the impact of a pebble thrown up from the road), the crack propagates very easily, often with very little applied load. Many other materials (ductile metals for example) have high fracture toughness even when a crack is present in the structure, the structure can still carry a large load without additional propagation of the crack. In industries that commonly employ high-performance carbon-fiber composites—aerospace, for example—it has been demonstrated that fibrous reinforcement across the plane of the laminating resin or adhesive significantly increases the interlaminar (that is, between layers) fracture toughness of the material in that region. Similarly, in the backer board with fabric inserted between the polymeric film facers and the foam core, the fibers of the fabric extend across the plane of the adhesive and, therefore, increase the fracture toughness of the adhesive bond. Thus, even if a small region of the film has delaminated from the foam, or perhaps a small region never was well-bonded to the foam, the size of the delamination will not be likely to increase. In this way, increasing the fracture toughness enables robust and reliable manufacturing—the adhesive bonds are much more tolerant of the inevitable imperfections that occur in real-world, high-rate production.

Laminating a fabric to the polymeric film—the process step that occurs before the facer-to-foam bonding operation—can be achieved by common processing methods, e.g., extrusion lamination.

Extensive experimentation has shown that the inserted fabric layer enables a robust facer-to-foam adhesive bond, even in a real-world production environment. Reliable bonds of high strength have been demonstrated when the adhesive fully saturates (wets-out) the fabric layer during the facer-to-foam bonding operation, and similar high-strength bonds have been demonstrated even when the fabric layer is only partially saturated by adhesive. Whether or not the fabric is fully saturated, the fabric's fibers provide paths for the shear and tensile loads to be transferred from the polymeric film of the facer to the adhesive on the foam side of the interface.

Thus, with the insertion of a fabric layer between the polymeric film facer and the foam panel, a laminated backer board for wet-space construction has been invented that is lightweight, stiff, strong, waterproof, and mortar-bondable, and can be reliably manufactured in a real-world production environment.

SUMMARY

In one aspect the invention is a foam composite backer board for wet space construction. On each face of the rigid foam core, the backer board includes a first fabric layer fixed to the face of the rigid foam core with a polymeric adhesive, a dimensionally stable polymeric film fixed to the first fabric layer parallel to the face of the rigid foam core, and a second fabric layer on the dimensionally stable polymeric film opposite the first fabric layer. The first fabric layer enables a high strength, high reliability bond between the foam core and the dimensionally stable polymeric film. The second fabric layer is bondable to thin set mortar and related compositions in wet space construction, allowing for easier and better wet space assembly.

In another aspect the invention is a method of making a composite foam backer board that is bondable to thin set mortar and useful in wet space construction. The invention includes the steps of feeding two fabric layers and a melted polymer in between the two fabric layers to a pair of nip rollers to form a dimensionally stable composite facer structure.

In another aspect the method of the invention includes the steps of applying a dimensionally stable composite facer structure to at least one face of a rigid foam core board to add strength and rigidity to the foam core board and to provide the foam core board with a surface that is bondable to thin set mortar and related wet space adhesive and construction materials.

In another aspect the invention is a method of bonding a dimensionally stable polymeric film with little to no mechanical bonding sites to polymer (e.g., polystyrene) foam. The invention includes the steps of fixing a fabric to the dimensionally stable polymeric film. The invention further includes the steps of fixing said fabric to the polymer foam opposite the polymeric film, thereby enabling a high strength, high reliability bond between the polymer foam and the dimensionally stable polymeric film.

In yet another aspect the invention is a method of constructing a wet space. The method includes the steps of positioning a substantially waterproof foam composite backer board that is bondable to thin set mortar to a substrate, fastening the foam composite backer board directly to the substrate with fasteners to create a waterproof substrate, applying thin set mortar directly to one face of the composite backer board, and applying a shower surface to one face of the composite backer board using the thin set mortar.

The foregoing illustrative summary, as well as other exemplary objectives and advantages of the invention, and the manner in which the same are accomplished, are further explained within the following detailed description and its accompanying drawing.

DETAILED DESCRIPTION

Figure 1:
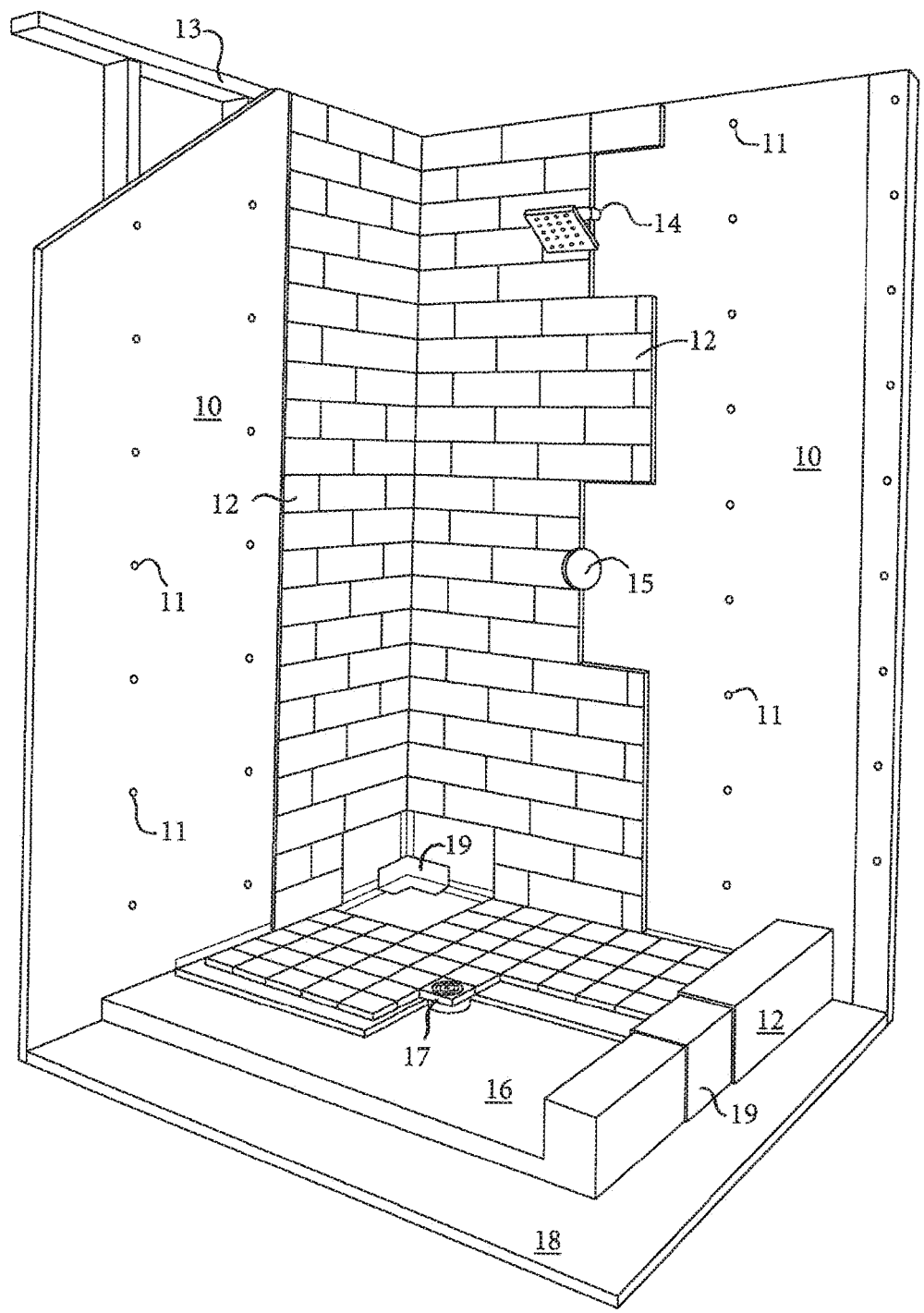
FIG. 1 is a perspective view of a wall shower assembly according to the invention.

FIG. 1 is a perspective view of a wall shower assembly or wet space according to the present invention. FIG. 1 shows the foam composite backer board (10) used in the construction of a shower wet space. Although the foam composite backer board (10) is useful in wet space construction other than shower assemblies, FIG. 1 gives helpful context for how the foam composite backer board (10) is used.

The foam composite backer board (10) is substantially waterproof. Because the foam composite backer board (10) is substantially waterproof, the foam composite backer board (10) can be fastened directly to (for example) a framed wall substrate (13) or a flooring substrate (18) with typical backer board screws or galvanized roofing nails (11) without the need for washers. As illustrated in FIG. 1, the foam composite backer board (10) may also be fastened directly to a substrate (13, 18) without the need to apply an additional waterproof membrane between the backer board (10) and the tile covering (12). The backer board (10) may be applied in this manner to any wet space substrate and is not limited to vertical wall substrate application.

The backer board (10) is of a suitable thickness for wet space construction (e.g., ¼-2 inch) and yet provides the necessary rigidity and tensile, flexural, and shear strength for tile application.

The extent to which a wall material thickness is suitable is, of course, the choice of the builder or owner. Conventionally, however, the most common size of backer board (to which foam backer board for wet space is most closely related) is 3 feet wide by 5 feet long by ¼-⅝ inch thick. Conventional backer board of this size weighs about 2-3 pounds per square foot, but the foam backer board will typically weigh between 0.35-0.6 pounds per square foot.

Accordingly, ¼, ½, and ⅝ inch are among the most common thicknesses for the backer board of the present invention.

The backer board (10; FIG. 1) is easily cut to allow for openings for plumbing fixtures such as a faucet opening (15), and a shower head (14). FIG. 1 also illustrates a shower drain (17).

A wet space surface (12), such as tile or stone, is applied to the backer board (10).

A shower base (16) may be used in conjunction with the backer board (10) to simplify shower construction. When appropriate, a waterproof membrane (19) may be applied to the shower base, corners, and perpendicular edges to support waterproof construction.

FIG. 1 illustrates a curb style shower, but this is illustrative rather than limiting of the invention.

Figure 2:
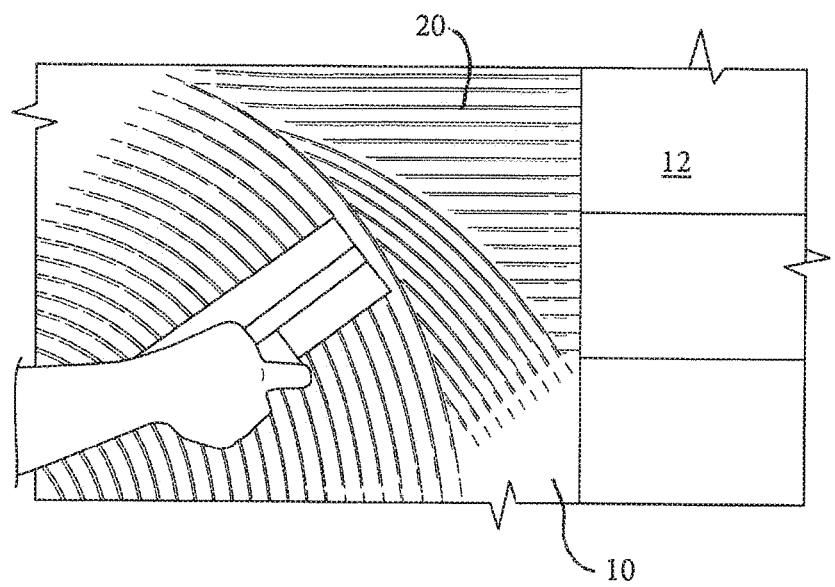
FIG. 2 is a perspective view of shower surface application to the wall.

FIG. 2 is a perspective view of the application of a shower surface (12), such as tile or stone, to the backer board (10). The backer board (10) is bondable to thin set mortar (20), which allows shower surface tile (12) to be applied to the backer board (10) without additional anchors and sealants. FIG. 2 shows the application of thin set mortar (20) directly to one face of the backer board (10) and the application of shower surface tile (12) to one face of the backer board (10) using the thin set mortar (20).

Figure 3:
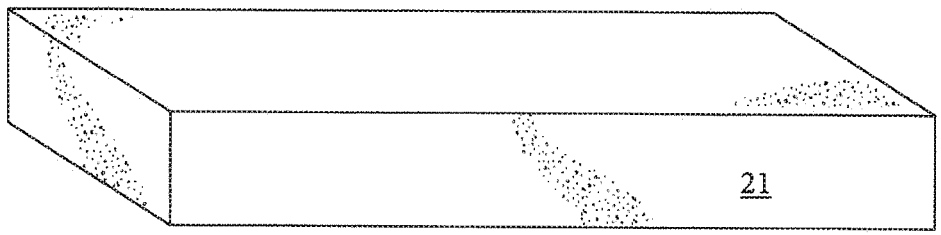
FIG. 3 is perspective view of the foam core alone.

FIG. 3 is a perspective view of the foam core (21) alone. In the exemplary embodiment, the foam core (21) consists of extruded polystyrene (XPS) foam. In alternative embodiments, the foam core (21) may consist of expanded polystyrene (EPS), polyethylene-terephthalate (PET), or polyisocyanurate (ISO) foam.

Figure 4A:
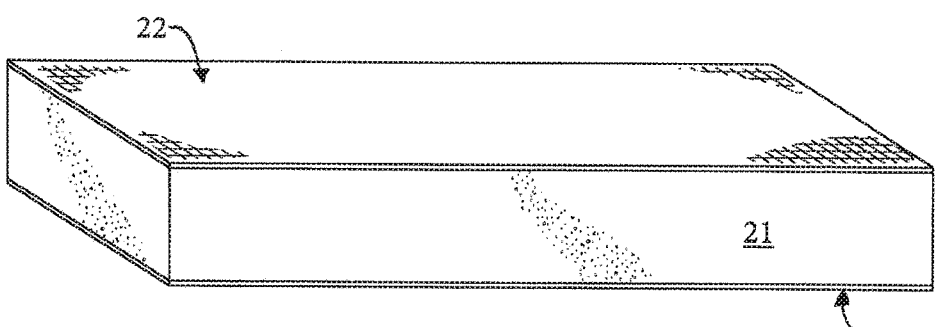
FIG. 4A is a perspective view of the foam core and the front-facing composite layer.
Figure 4B:
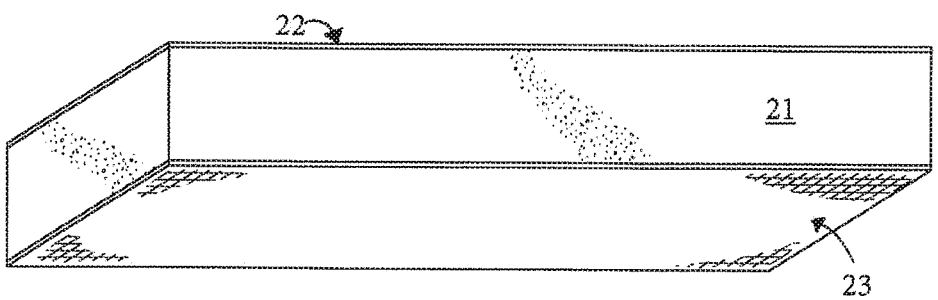
FIG. 4B is a perspective view of the foam core and the rear-facing composite layer.

FIG. 4A is a perspective view of the foam core (21) and the front-facing composite facer layer (22) of the backer board (10). FIG. 4B is a perspective view of the foam core (21) and the rear-facing composite facer layer (23) of the backer board (10).

Figure 5:
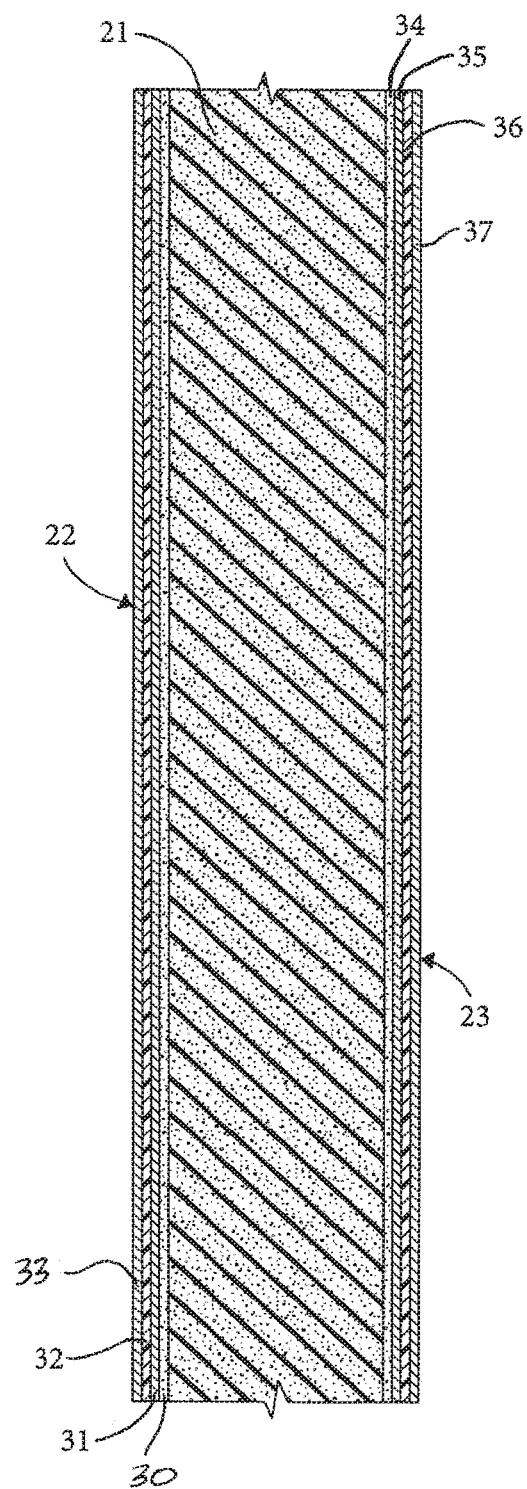
FIG. 5 is a cross-sectional view of the foam composite backer board layers.

In the illustrated embodiment, a front-facing composite facer layer (22) is fixed directly to one face of the rigid foam core (21) with a polymeric adhesive (30, e.g., FIG. 5). A rear-facing composite facer layer (23) is fixed directly to another face of the rigid foam core (21) with a polymeric adhesive (34, e.g., FIG. 5) opposite the front-facing composite facer layer (22). At least one of the outer fabrics (33 or 37) is bondable to thin set mortar.

FIG. 5 is a cross-sectional view of the backer board (10) and shows greater detail of the facer layers (22, 23) illustrated in 4A and 4B.

FIG. 5 shows that the foam composite backer board (10) is made up of several layers affixed to each other. A first fabric layer (31) is affixed to at least one face of the rigid foam core (21) with a polymeric adhesive (30). A first dimensionally stable polymeric film (32) is affixed to the first fabric layer (31), parallel to the face of the rigid foam core (21), providing sufficient flexural strength for wet space construction (e.g., at least 250 PSI when measured according to ASTM C947). A second fabric layer (33) is affixed to the first dimensionally polymeric film (32) opposite the first fabric layer (31). The first fabric layer (31) comprises the inner fabric layer, whereas the second fabric layer (33) comprises the outer fabric layer of the front-facing composite layer (22).

A third fabric layer (35) is affixed to at least one face of the rigid foam core (21) with a polymeric adhesive (34). A second dimensionally stable polymeric film (36) is affixed to the third fabric layer (35), parallel to the face of the rigid foam core (21). A fourth fabric layer (37) is affixed to the dimensionally stable polymeric film (36) opposite the third fabric layer (35). The third fabric layer (35) comprises the inner fabric layer, whereas the fourth fabric layer (37) comprises the outer fabric layer of the rear-facing composite layer (23).

At least one outer fabric layer (33 or 37) is bondable to thin set mortar (20) and related compositions in wet space construction.

The inner fabric layer (31 or 35) is thick enough to prevent the adhesive from entirely saturating the fabric's bonding sites but thin enough to maintain the fabric's lateral stability as part of the composite. The inner fabric layer (31 or 35) may consist of a scrim or knitted, woven, or nonwoven fabric, e.g., a 0.75 osy (ounce per square yard)-2.25 osy polypropylene spun bond possessing a porosity sufficient to provide mechanical bonding sites for the adhesive (e.g., dry, fibrous microstructure).

Figure 6:
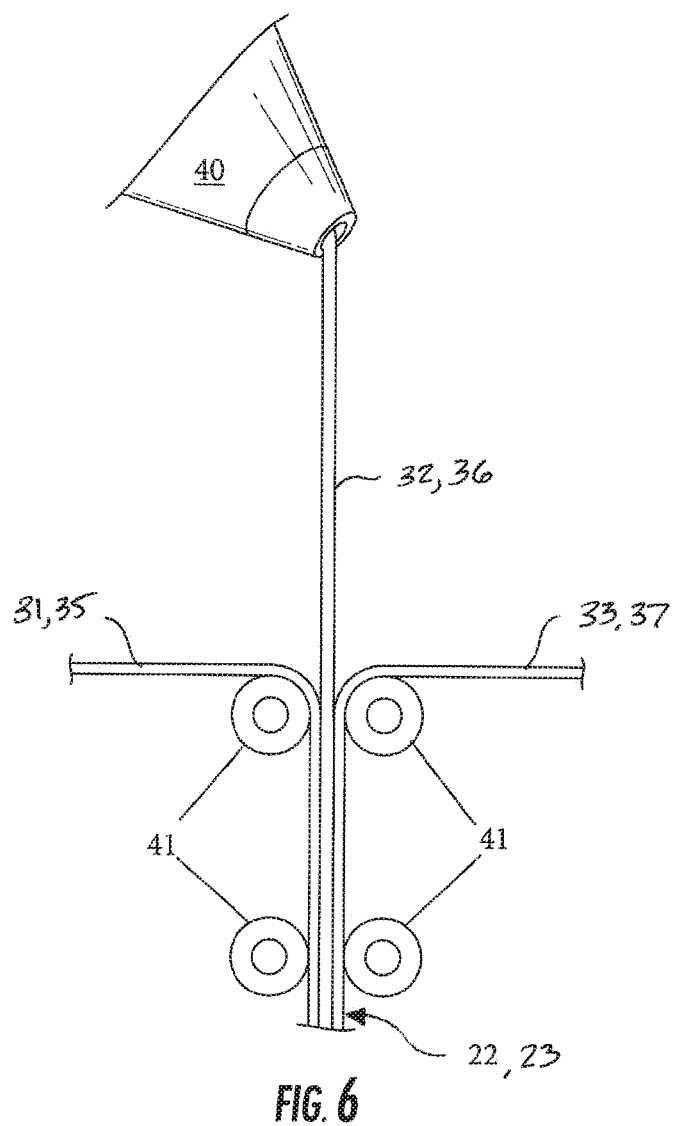
FIG. 6 is a schematic view of the facer layer manufacturing process.

FIG. 6 is a schematic view of the manufacturing process of one of the facer layers (22 or 23).

As illustrated in FIG. 6, a composite facer layer (22 or 23) is formed by feeding two fabric layers (31 and 33 or 35 and 37) and a melted polymer (32 or 36) between the two fabrics (31 and 33 or 35 and 37) to a pair of nip rollers (41). The nip rollers (41) join the fabrics (31 and 33 or 35 and 37) and the melted polymer (32 or 36). The melted polymer (32 or 36) is then cured to produce a dimensionally stable composite facer structure (22 or 23). Depending upon the polymer composition, curing can include exposure to light or to heat, or simply allowing the polymer to cure at room temperature for an appropriate time interval.

The resulting composite facer structure (22 or 23) consists of a dimensionally stable polymeric film (32 or 36), an outer fabric layer (33 or 37) fixed to at least one face of the dimensionally stable polymeric film (32 or 36), and an inner fabric layer (31 or 35) fixed to the dimensionally stable polymeric film (32 or 36) opposite the outer fabric layer (33 or 37).

The dimensionally stable polymeric film (32 or 36) may be a thermoplastic or thermosetting material. The dimensionally stable polymeric film (32 or 36) also has a relatively high modulus (e.g., 200,000 psi or greater) and a tensile strength of at least 25 lb./inch.

Those of skill in the art will recognize that a higher modulus polymer can be applied in a thinner layer than a lower modulus polymer in order to obtain the same effect. Thus, for oriented polystyrene the lower limit is typically about 0.003 inch thickness (three mil), with an upper limit of about 0.015 inch (15 mil). Applying a thicker layer of other types of materials is possible to gain the same effect, but can complicate the manufacturing process or add to the cost of materials or both.

When fixed to either face of the foam core (21), the composite facer structure (22 or 23) adds flexural strength and rigidity to the foam core board (21). The composite facer structure (22 or 23) further provides the foam core board (10) with a surface that is bondable to thin set mortar (20) and related wet space adhesive and construction materials. As the skilled person recognizes, if a backer board (e.g., the composite) has an insufficient or inappropriately low flexural strength, a resulting finished wall built using the board can exhibit cracks, broken grout or delaminated tile under stresses that would otherwise be considered moderate.

In the specification and drawings, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A composite backer board for wet space construction, said board consisting essentially of:
  a rigid foam core of a suitable thickness for wet space construction;
  a first polymeric adhesive;
  a first fabric layer fixed with the first polymeric adhesive to a face of said rigid foam core;
  a first polymeric film on said first fabric layer in which the polymeric film is dimensionally stable parallel to said face of said rigid foam core; and
  a second fabric layer on said first polymeric film opposite said first fabric layer and forming a first face that is amenable to thin set mortar and related compositions in wet space construction.

2. A composite backer board consisting essentially of:
  a rigid foam core of a suitable thickness for wet space construction;
  a first polymeric adhesive;
  a first fabric layer fixed with the first polymeric adhesive to a face of said rigid foam core;
  a first polymeric film on said first fabric layer in which the polymeric film is dimensionally stable parallel to said face of said rigid foam core;

a second fabric layer on said first polymeric film opposite said first fabric layer and forming a first face that is amenable to thin set mortar and related compositions in wet space construction;

a second polymeric adhesive;

a third fabric layer fixed with said second polymeric adhesive to an opposite face of said rigid foam core from said first and second fabric layers;

a second polymeric film on said third fabric layer in which the polymeric film is dimensionally stable parallel to said opposite face of said rigid foam core; and a fourth fabric layer on said second polymeric film opposite said third fabric layer and forming a second face that is amenable to thin set mortar and related compositions in wet space construction.

3. The composite backer board according to claim 1, wherein said first polymeric film is selected from the group consisting of thermoplastic material and thermosetting material.

4. The composite backer board according to claim 1, wherein said foam core layer is comprised of foam selected from the group consisting of extruded polystyrene (XPS), expanded polystyrene (EPS), polyethylene-terephthalate (PET), or polyisocyanurate (ISO).

5. A The composite backer board according to claim 1, wherein said foam core layer comprises extruded polystyrene foam.

6. The composite backer board according to claim 1, wherein said foam composite backer board has a water vapor permeability of 0.5 perms or less measured according to ASTM E96 Procedure E (100° F., 90% RH) for ½ inch thick of board.

7. The composite backer board according to claim 1, wherein said composite backer board has a flexural strength of at least 250 PSI when measured according to ASTM C947.

8. The composite backer board according to claim 1, wherein said first polymeric film has a modulus of elasticity and tensile strength that when combined with the thickness of the facer, provides the necessary flexural stiffness and strength for tile applications.

9. The composite backer board according to claim 8, wherein said first polymeric film has a modulus of elasticity of at least 200,00 PSI and a tensile strength of at least 25 lb./inch.

10. The composite backer board according to claim 1, wherein said first fabric layer has a thickness sufficient to prevent the first polymeric adhesive from entirely saturating the fabric's bonding sites.

11. The composite backer board according to claim 10, wherein said first fabric layer has a thickness that defines a weight of between about 0.75 and 2.25 osy.

12. The composite backer board according to claim 1, wherein said fabric is selected from the group consisting of a polyolefin-based scrim or knitted, woven, or nonwoven fabric.

13. A composite backer board for wet space construction, said board comprising:

a rigid foam core of a suitable thickness for wet space construction;

a first facer layer consisting essentially of:
   a first polymeric film,
   a first fabric layer fixed to at least one face of said first polymeric film, and
   a second fabric layer fixed to said first polymeric film opposite the first fabric layer, wherein said first fabric layer is fixed to one face of said rigid foam core with a first polymeric adhesive; and a second facer layer consisting essentially of:
   a second polymeric film,
   a third fabric layer, and
   a fourth fabric layer fixed to said second polymeric film opposite the third fabric layer; wherein said third fabric layer is fixed to one face of said rigid foam core opposite said first facer layer with a second polymeric adhesive.

14. The composite backer board according to claim 13, wherein the first polymeric film is dimensionally stable.

15. The composite backer board according to claim 14, wherein at least one of said fabrics is bondable to thin set mortar.

16. The composite backer board according to claim 13, wherein said foam core is comprised of foam selected from the group consisting of extruded polystyrene (XPS), expanded polystyrene (EPS), polyethylene-terephthalate (PET), or polyisocyanurate (ISO).

17. The foam backer board according to claim 12, wherein said foam comprises extruded polystyrene.

\* \* \* \* \*